United States Patent
Chaudhry et al.

(10) Patent No.: US 10,412,458 B2
(45) Date of Patent: *Sep. 10, 2019

(54) METHOD AND SYSTEM FOR PROVIDING ACCESS TO CONTENT DATA FOR PREVIOUSLY BROADCASTED CONTENT

(71) Applicant: The DIRECTV Group, Inc., El Segundo, CA (US)

(72) Inventors: Kapil Chaudhry, Cerritos, CA (US); Sri Hari Swaroop Nidichenametla, Torrance, CA (US); Jin H. Chung, Fullerton, CA (US); Fred Grigoryan, Burbank, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/959,748

(22) Filed: Apr. 23, 2018

(65) Prior Publication Data

US 2018/0249221 A1    Aug. 30, 2018

Related U.S. Application Data

(63) Continuation of application No. 13/743,230, filed on Jan. 16, 2013, now Pat. No. 9,973,823.

(51) Int. Cl.
| | | |
|---|---|---|
| *H04N 7/025* | (2006.01) | |
| *H04N 21/482* | (2011.01) | |
| *H04N 21/262* | (2011.01) | |
| *H04N 21/433* | (2011.01) | |
| *H04N 21/4623* | (2011.01) | |
| *H04N 21/4788* | (2011.01) | |
| *H04N 21/858* | (2011.01) | |

(52) U.S. Cl.
CPC ..... *H04N 21/482* (2013.01); *H04N 21/26283* (2013.01); *H04N 21/4334* (2013.01); *H04N 21/4623* (2013.01); *H04N 21/4788* (2013.01); *H04N 21/8586* (2013.01)

(58) Field of Classification Search
CPC ................................................... H04N 21/482
USPC .......................................................... 725/55
See application file for complete search history.

(56) References Cited

U.S. PATENT DOCUMENTS

| | | | |
|---|---|---|---|
| 7,344,084 B2 | 3/2008 | DaCosta | |
| 7,603,683 B2* | 10/2009 | Reto | ................. H04L 29/06027 709/204 |
| 7,665,108 B2 | 2/2010 | Park et al. | |
| 7,712,125 B2* | 5/2010 | Herigstad | .............. H04N 7/163 725/141 |
| 7,873,974 B2 | 1/2011 | DaCosta | |
| 8,438,598 B2* | 5/2013 | Sakai | ................... H04N 5/4403 725/46 |

(Continued)

OTHER PUBLICATIONS

Tryit Editor, "Try HTML Form Submit", W3 Schools, Jan. 1, 2012. <http://www.w3schools.com/html/tryit.asp?filename+tryhtml_form_submit>.

*Primary Examiner* — Michael B. Pierorazio
(74) *Attorney, Agent, or Firm* — Harness, Dickey & Pierce, P.L.C.

(57) ABSTRACT

A system and method for accessing past program guide data includes a program guide repository storing past program guide data and a controller receiving a request for past program guide data and communicating the past program guide data to a user device located separated from the controller.

20 Claims, 9 Drawing Sheets

(56) References Cited

U.S. PATENT DOCUMENTS

| | | | |
|---|---|---|---|
| 8,588,588 B2* | 11/2013 | Horibe | H04N 5/76 386/291 |
| 8,607,276 B2* | 12/2013 | Chang | H04N 21/42203 704/246 |
| 9,225,930 B2 | 12/2015 | Arling et al. | |
| 2003/0101456 A1* | 5/2003 | Park | H04N 5/44543 725/55 |
| 2004/0031058 A1* | 2/2004 | Reisman | G06F 17/30873 725/112 |
| 2006/0161950 A1* | 7/2006 | Imai | H04N 5/445 725/46 |
| 2007/0016927 A1* | 1/2007 | Robey | H04N 5/44543 725/46 |
| 2007/0033533 A1* | 2/2007 | Sull | G06F 17/30796 715/752 |
| 2007/0050813 A1* | 3/2007 | Lee | H04N 5/44543 725/40 |
| 2007/0067808 A1* | 3/2007 | DaCosta | H04N 7/17318 725/62 |
| 2007/0124775 A1* | 5/2007 | DaCosta | H04N 7/17318 725/62 |
| 2008/0115169 A1* | 5/2008 | Ellis | H04H 60/31 725/46 |
| 2008/0134245 A1 | 6/2008 | DaCosta | |
| 2008/0134256 A1 | 6/2008 | DaCosta | |
| 2008/0235733 A1* | 9/2008 | Heie | H04N 7/163 725/46 |
| 2008/0288460 A1* | 11/2008 | Poniatowski | G06F 17/30646 |
| 2009/0063994 A1* | 3/2009 | Pickelsimer | G06F 17/30017 715/753 |
| 2009/0254672 A1* | 10/2009 | Zhang | H04N 21/23106 709/231 |
| 2010/0122289 A1* | 5/2010 | Jean | H04N 7/163 725/37 |
| 2010/0131385 A1 | 5/2010 | Harrang et al. | |
| 2011/0191439 A1* | 8/2011 | Dazzi | G06F 15/16 709/217 |
| 2011/0191446 A1* | 8/2011 | Dazzi | G06F 15/16 709/219 |
| 2011/0270692 A1 | 11/2011 | Harrang et al. | |
| 2012/0272273 A1* | 10/2012 | Grannan | H04N 5/445 725/50 |
| 2013/0042262 A1* | 2/2013 | Riethmueller | G06F 17/30846 725/14 |
| 2013/0133005 A1 | 5/2013 | Sakai et al. | |
| 2014/0013342 A1* | 1/2014 | Swan | H04N 21/2343 725/5 |

\* cited by examiner

METHOD AND SYSTEM FOR PROVIDING ACCESS TO CONTENT DATA FOR PREVIOUSLY BROADCASTED CONTENT

CROSS-REFERENCE TO RELATED APPLICATIONS

This application is a continuation of U.S. patent application Ser. No. 13/743,230 filed on Jan. 16, 2013. The entire disclosure of the above application is incorporated herein by reference.

TECHNICAL FIELD

The present disclosure relates to a content communication system, and, more specifically, to a method and system for providing access to data associated with previously broadcasted content.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as storage for the operating code of the set top box.

Content is constantly being broadcasted. Typically, a content provider provides various user devices with program guide data for future content. As the time passed the old guide data is removed or written over so that the guide data is relevant for the current time slot and future time slots. The use of media devices is increasingly popular. As well, social media is also increasingly popular. Particularly in social media settings, people continually comment on various aspects of life including content viewed. People reviewing such descriptions have no way to obtain data regarding prior broadcasts because guide data is not provided for past events.

SUMMARY

The present disclosure provides a method and apparatus for providing access to content data for previously broadcasted content. Access to previously broadcasted content enables searching for previously broadcasted data as well as finding future data.

In one aspect of the disclosure, a method includes storing past program guide data for content broadcasted in the past in a program guide repository, receiving a request for past program guide data from a user device located separate from the program guide repository, retrieving the past program guide data from the program guide repository; and communicating the past program guide data to the user device.

In another aspect of the disclosure, a system includes a program guide repository storing past program guide data and a controller receiving a request for past program guide data and communicating the past program guide data to a user device located separated from the controller.

In a further aspect of the disclosure, a method includes storing past program guide data for a first content broadcasted in the past in a program guide repository, receiving a request for guide data for the first content from a first user device located separate from the program guide repository, determining past program guide data for the first content from the program guide repository, determining a future broadcast data for the first content in response to the past program guide data, and communicating future broadcast data to the user device.

In yet another aspect of the disclosure, a system includes a program guide repository storing past program guide data and a controller receiving a request for guide data for a first content. The controller determines past guide data for the first content from the repository and determining future guide data using the past guide data and communicates the future guide data to a user device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
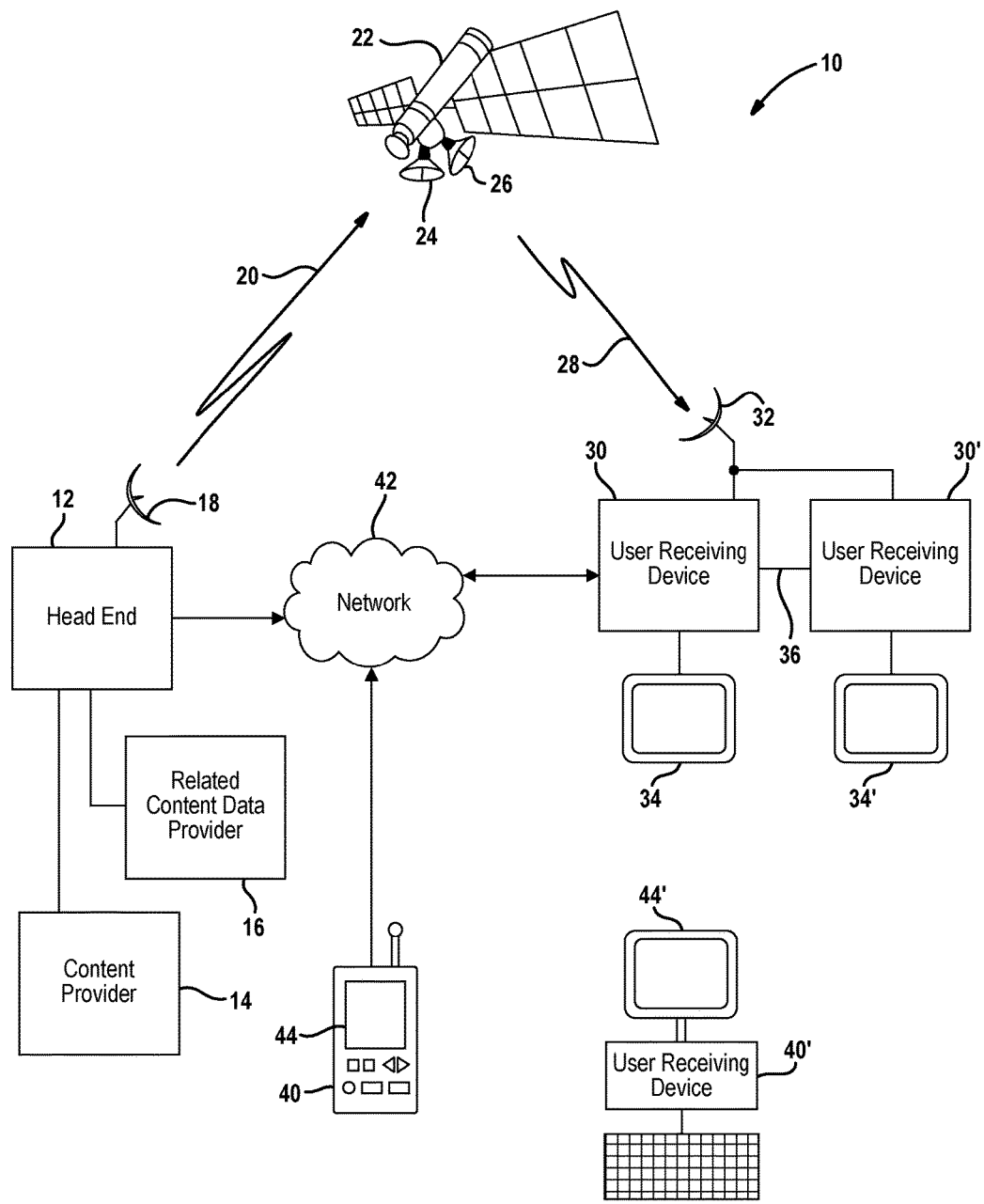
FIG. 1 is a block diagrammatic view of a content communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Referring now to FIG. 1, a communication system 10 is illustrated. The communication system 10 includes a head end 12 that is used as a content processing system and a transmission source. The head end 12 may also be used for distributing content and providing billing data. The details of the head end 12 will be further described below in FIG. 2.

A plurality of content providers 14, only one of which is illustrated, may provide content and data related to the content such as metadata to the head end 12. The metadata may include actors, a description, categories, ratings, broadcast time, channel identifies, actors, directors and other data. The head end 12 receives various types of content and data from the content provider and communicates the content to various user devices associated with the system.

The head end 12 may be in communication with a related content data provider 16. Although the related content data provider 16 is illustrated as a separate component, the related content data provider 16 may be included within the head end 12. The related content data provider 16 may generate related content data that is related to content identified by the head end 12. The head end 12 may make a request for related content data from the related content data provider 16. An example of a related content provider is VTAP. Related content data may include data that is similar to the request provided by the head end 12. The related content may be television shows, movies or other types of broadcasted programming. Related content may be related in various ways including programming with the same genre, with the same directors, that are related by an advisory or editorial board, or with the same actors or actresses. Of course, other types of relations may be set forth. Multiple types of relationships may also be formed between the various types of data.

The head end 12 may communicate content to users in various manners including a satellite system and through terrestrial networks. Carrying through with the satellite example, the head end 12 includes an antenna 18 for communicating process content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

Two different types of user devices are illustrated. In this example, a first user device 30 includes a receiving antenna 32. The user device 30 has a display 34 associated therewith. The user device 30 may be referred to as a fixed user device because the user device is intended to be used from a fixed position on the surface of the earth. The user device 30 may be referred as a set top box. The user device 30 may include circuitry to tune, decode and store content therein. Details of the user device 30 are further described below.

The user device 30 may be in communication with a second user device 30' through a network 36 such as a local area network. The second user device 30' may be associated with a display 34'. Content may reside in one or the other user device 30, 30' and may be delivered to another in a multi-room viewing function.

Another type of user device includes a network user device 40. The network user device 40 may not be capable of receiving signals from the satellite 22. Rather, the network user device 40 may receive content through a network 42. The network user device 40 may include a display 44 for displaying content thereon. The network user device 40 may include various circuitry including a browser or other processing circuitry for receiving, decoding and processing the content so it may be displayed on the display 44. The network user device 40 may be a mobile phone, personal digital assistant, or the like. The network user device may be referred to as a mobile user device. Details of the network user device will be further described below.

Another example of a network user device is a computer 40'. The computer may also include a display 44' for displaying content thereon. The computer 40' may be a fixed (desktop) computer or a mobile (laptop) computer. Several user network device devices and user devices may be associated with a single account.

The network 42 may be a single network or a combination of different networks or different types of networks. For example, the network 42 may be a broadband wired network or wireless network. The network 42 may be a one-way network so that data may be communicated from the user device 30 to the head end 12. The network 42 may also be used in a two-way capacity for delivering content and data from the head end 12 in response to selection signals communicated from the user device 30, 30', 40 or 40'. The network 42 may be in communication with the local area network 36.

Figure 2:
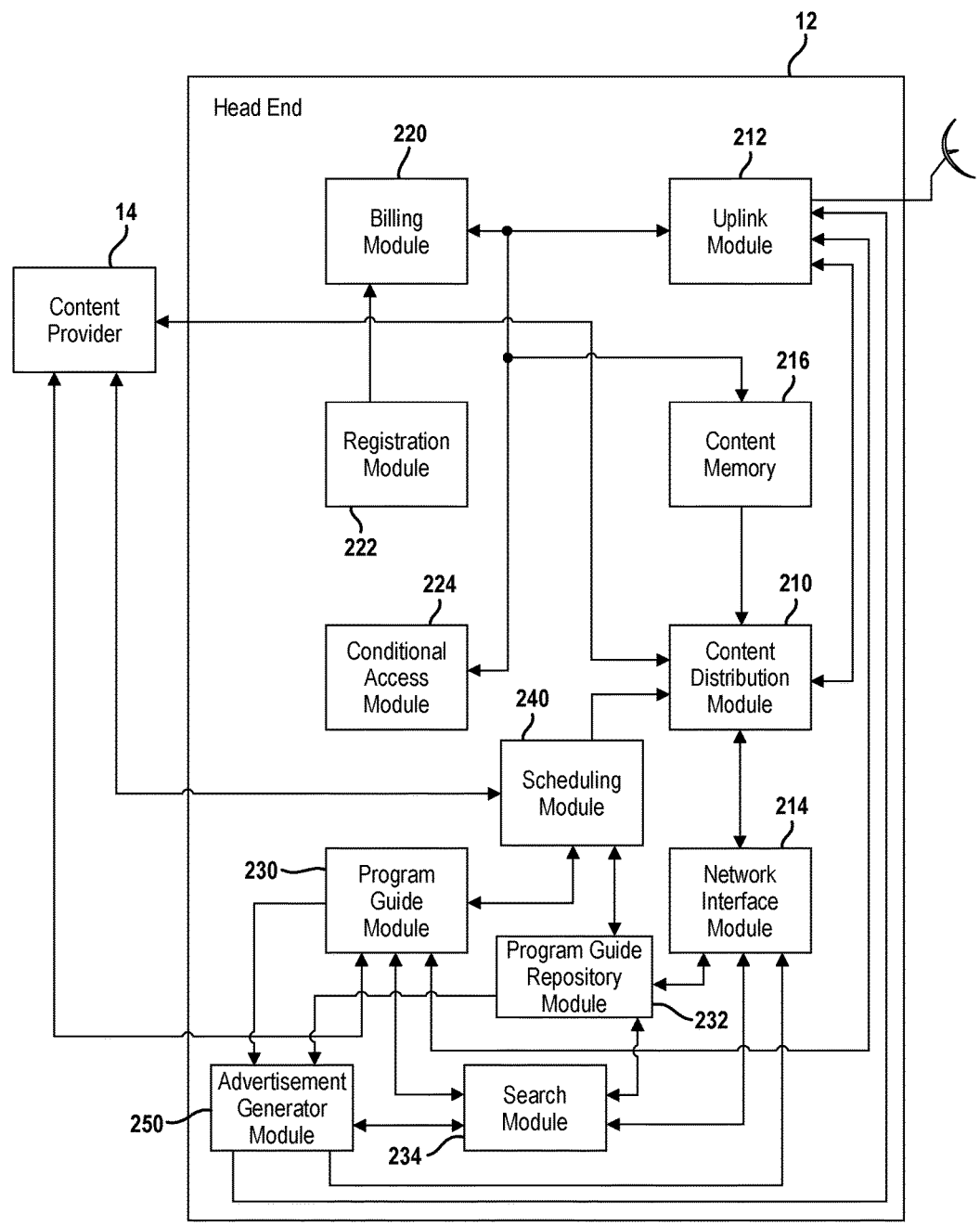
FIG. 2 is a block diagrammatic view of a head end according to the disclosure.

Referring now to FIG. 2, details of the head end 12 relevant to the present example are set forth. It should be noted that the head end 12 is illustrated within one box which may represent in one or more facilities. That is, each of the individual components illustrated within the head end 12 may be physically located in various locations.

The head end 12 may include a content distribution module 210 that is used for distributing content through different means. The head end 12 may be in communication with an uplink module 212 for uplinking content to the satellite through the uplink antenna 18 as illustrated in FIG. 1. The content distribution module 210 may thus format the signal in an appropriate format for uplinking through the uplink module 212. The uplink module 212 may uplink various content including a first content and a second content through the satellite to the user devices. The content distribution module 210 may also transcode the content in a format suitable for use by the receiving device.

The uplink module 212 may also communicate conditional access data to the user devices for accessing the content. The conditional access data may be communicated in a conditional access packet that includes data for tuning the user device to receive the data. The conditional access data may be received directly or indirectly from conditional access module 224. The conditional access module 224 may provide conditional access signals to the billing module 220 to allow a particular user access to content. The conditional access module 224 may generate a conditional access packet together with data from the billing module 220 for uplinking through the uplink module 212. If the content is satellite content, access data such as, but not limited to, the particular transponder, channel and time at which the content is broadcasted may be provided in the conditional access packet. If the content is to be provided over an internet or other broadband-type network, the IP address of the content may be provided. The conditional access packet may also include encryption/decryption information for the user device to receive the content and decode the content.

The content distribution module 210 may also be in communication with a network interface module 214. The network interface module 214 may be in communication with the network 42 for communicating content there through. The network interface module 214 (or the content distribution module 210) may format the content signals into internet protocol signals for distribution through the network 42.

The content distribution module 210 may also be in communication with content memory 216. The content memory 216 may be referred to as a content repository. The content memory 216 may receive content from the content provider 14 for distribution through the satellite system or the network 42. The content memory 216 may save on-demand or pay-per-view content therein.

The content provider 14 may also provide live television content for distribution through the content distribution module 210. The content distribution module 210 may thus communicate live content through the uplink module 212 or through the network interface module 214 to the appropriate networks.

A billing module 220 may also be incorporated into the head end 12. The billing module 220 may be used for associating one or more user devices with a user account. For example, different types of user devices such as a plurality of mobile devices and one or more fixed set top boxes may be associated with a user account. By associating the plurality of user devices with a user account, content may be shared or accessed by each of the user devices associated with an account.

A registration module 222 may be used to associate each of the plurality of user devices with a user account at the billing module 220. The registration module 222 may be an automated system through which the user calls or accesses remotely by computer for associating the plurality of user devices with the account. The registration module 222 may also be partially human activated in which a customer service representative enters the data for multiple user devices and associates the user devices with an account.

A program guide module 230 may also be included within the head end 12. The program guide module 230 receives metadata and other data from the content provider 14 that corresponds to future content. Future content is content that will be broadcasted at a future time (beyond the present time). The program guide module 230 is ultimately used to communicate the content data and metadata to the uplink module 212. The program guide module 230 may thus contain data related to the ratings of the particular content to be broadcasted and controlled by the content distribution module 210. The program guide module 230 (and the program guide repository module 232) may be a web service used for providing program guide data to requesting devices or services through the network.

The head end 12 may also include a program guide repository module 232. The program guide repository module 232 is used for storing past program guide data for content that was previously broadcasted or before the present time. That is, as the content is broadcasted, the program guide data typically becomes irrelevant and is removed or overwritten. However, the program guide repository module 232 is used to save the program guide data for use by later applications including searching and looking forward for related or the same content. The program guide repository module 232 may include a database, readers and other web based interfaces. The program guide repository module 232 and its operation will be described further below.

A search module 234 may also be disposed within the head end 12. The search module 234 may be in communication with the program guide module 230 and the program guide repository module 232. The operation of the search module 234 will be described below. In short, the search module 234 may be used to search for past program guide data in the program guide repository module 232 and for searching future program guide data in the program guide module 230. The search module 234 may also request related content from the related content data provider 16 illustrated in FIG. 1. The search module 234 may also be in communication with the network interface module 214.

A scheduling module 240 may be in communication with the program guide module 230, the program guide repository module 232 and the content distribution module 210 to arrange the content to be distributed as well as provide program guide data for the content to be distributed. The scheduling module 232 may also be in communication with the content provider 14 for obtaining a schedule for live channel broadcast.

An advertisement generator module 250 may also be included within the head end 12. The advertisement generator module 250 may be in communication with the program guide module 230, the program guide repository module 232 and the search module 234. The advertisement generator module may receive watched content list from the network interface module 212. The watched content list may originate from each user receiving device. Based upon the watched content, the search module 234 may determine guide data for past programming. The search module may then, using the program guide module 230, search for content related to the task guide data and generate advertisements for future programming. The advertisements for future programming may be communicated to the user devices through the network interface module 214 or through the uplink module 212.

Figure 3A:
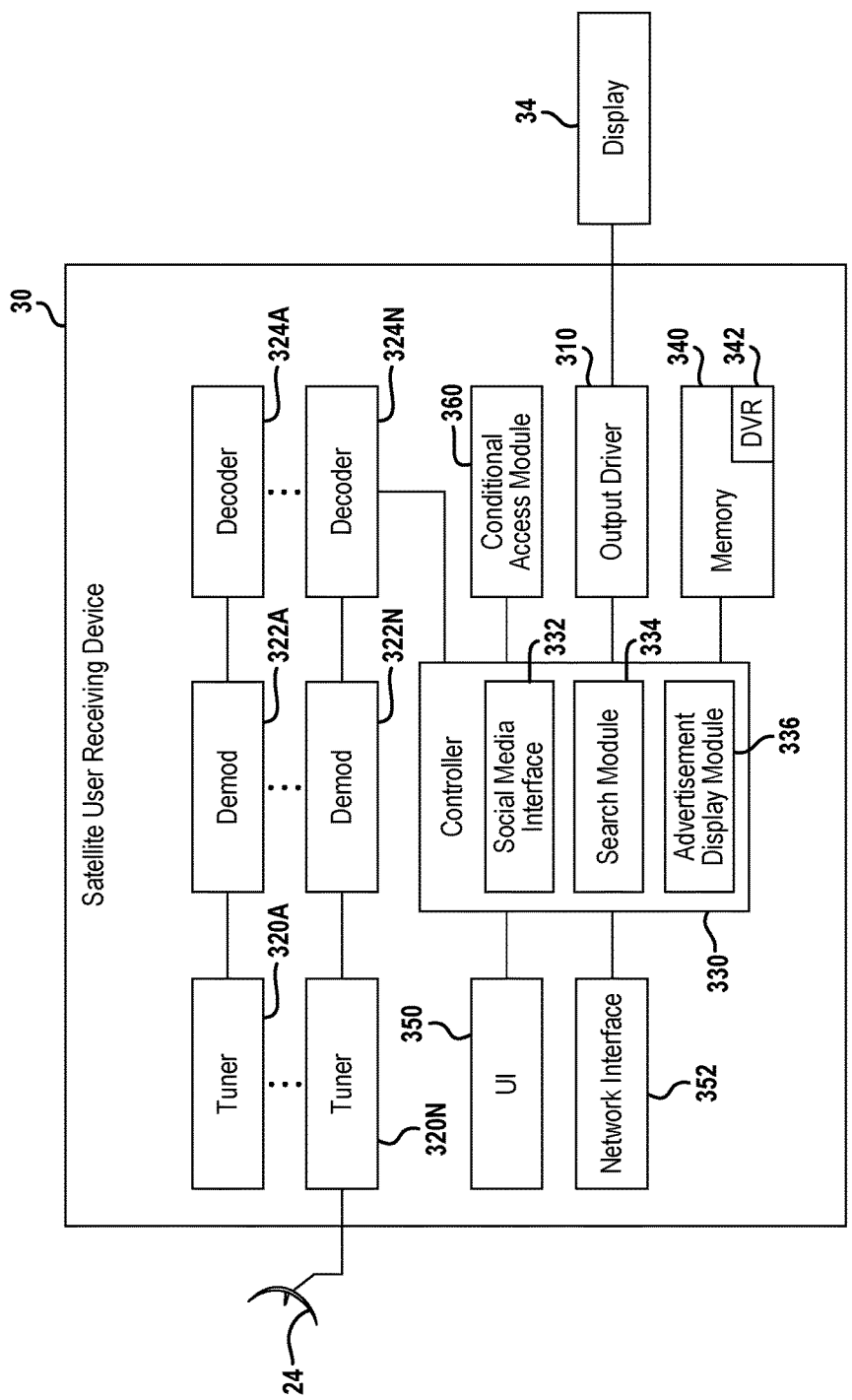
FIG. 3A is a block diagrammatic view of a satellite user device.

Referring now to FIG. 3A, the user receiving device 30 or set top box is illustrated in further detail. Although, a particular example using the set top box is illustrated, it is merely representative of various electronic devices with an internal controller used as a content receiving device. Set back boxes or televisions with control circuitry therein may include search functions. The antenna 24 may be one of a number of different types of antennas that may include one or more low noise blocks associated therewith. The antenna 24 may be a single antenna used for satellite television reception. Of course, multiple antennas for receiving signals from satellites in different orbital slots may be used. In a terrestrial system such as a cable television system, no antenna may be used. Rather, a connector to a fiber optic or coaxial cable may be used. The user receiving device 30, as described above, is coupled to a display 34. The user receiving device 30 may have an output driver 310 for formatting video and audible signals for the display 34.

The user recovery device 30 may include the controller 330 may be a general processor such as a microprocessor that cooperates with control software. The controller 330 may be used to coordinate and control the various functions of the user receiving device 30. These functions may include tuner 320A-320N (collectively 320), demodulator 322A-322N (collectively 322), decoders 324A-324N (collectively 324) such as forward error correction decoders and any buffer or other functions.

The controller 330 may include a social media interface 332. The social media interface 332 may provide an interface to various social media applications. The social media applications may be used to view postings from friends or other outside sources. The social media interface 332 may also allow the formation of links. When watching a particular program content, a link may be created and posted to a social media website using the social media interface 332. The social media interface 332 may be used to follow links posted by others. By selecting a link the set top box may be tuned to a currently broadcasted program.

The social media interface 332 may also be used to obtain data regarding past programming events. That is, social media sites are historic in nature in that postings may be viewed for events that have previously taken place. Users may post links while watching a particular program. However, if another user views the post at a later time, the event may not be available to be tuned to directly. By selecting a link, a request for data may be communicated to the head end. The request may include a content identifier or the like for the past event which may be obtained from the program guide repository. The program guide repository may include metadata for the requested content. In addition, a future event may also be returned that corresponds to the past event. This may allow the user to set a recording for the future event that corresponds to the past event. This process will be described further below.

The controller 330 may also include a search module 334. The search module 334 may be used to generate searches for content data related to currently broadcasted content as well as past broadcasted content. The past broadcasted content may be requested through the network interface 352.

The controller 330 may also include an advertisement display module 336. The advertisement display module 336 is used to display advertising that corresponds to previously viewed content. By way of example, the advertisement display module 336 may communicate previously viewed content or playlists to the head end which searches for future content that the user may be interested in. The advertisement display module 336 may display an advertisement in various locations in screen displays such as in the program guide screen display. The advertisement may be displayed in a row ad, poster, banner or in another manner.

The tuners 320 receive the signal or data from the individual channel. The tuners 320 may receive data from a satellite or a source such as cable or over-the-air TV broadcasts. The tuners 320 may receive television programming content, program guide data or other types of data. The demodulators 322 demodulate the signal or data to form a demodulated signal or data. The decoders 324 decode the demodulated signal to form decoded data or a decoded signal. The controller 330 may be similar to that found in current DIRECTV® set top boxes which uses a chip-based multifunctional controller. By providing a number of tuners, demodulators and decoders, a number of different content programs may be used by the receiving device. For example, live viewing and recording may be performed simultaneously. A number of recordings may be made simultaneously depending on the number of tuners available.

The controller 330 is in communication with a memory 340. The memory 340 is illustrated as a single box. The memory 340 may be implemented as a plurality of different types of memory including the hard drive, a flash drive and various other types of memory. The memory 340 may be other types of memory or sections of different types of memory. The memory 340 may be non-volatile memory or volatile memory. The memory 340 may include a DVR 342. The DVR 342 may include recorded content stored for later playback.

The memory 340 may include storage for various operational data collected during operation of the receiving device 30. For example, the memory 340 may store a profile or the data used to build the profile. Another type of data in the memory 340 may include the channels subscription data, the blocked channels, adult channels, rating limits set by the user receiving device 30, current set top box language, TV resolution data, to do list data, the conditional access module identifier, time zone data, time of day daylight savings, status data, aspect ratio data, viewing hours data, viewed content, playlist data, quick tune list and a zip code.

The memory 340 may also store the advanced program guide data. The memory 340 may store program guide data that is received at the head end. The program guide data may include amounts of data including two or more weeks of program guide data. The program guide data may be communicated to the user receiving device 30 in various manners including through the satellite 22 of FIG. 1. The program guide data may include content or program identifiers, and various data objects corresponding thereto.

The user receiving device 30 may also include a user interface 350. The user interface 350 may be various types of user interfaces such as a keyboard, push buttons, a touch screen, a voice activated interface or the like. The user interface 350 may be used to select a channel, select information such as content selections, change the volume, change the display appearance, or other functions. The user interface 350 may also be used for selecting playback locations of the content.

A network interface 352 may be included within the user device 30 to communicate various data through the networks 36/42 described above. The network interface 352 may be a WiFi, WiMax, WiMax mobile, wireless, cellular, or other types of communication systems. The network interface 352 may use various protocols for communication therethrough including, but not limited to, hypertext transfer protocol (HTTP).

The user device 30 may also include a conditional access module 360. The conditional access module 360 prevents unauthorized reception of the television signals through the antenna 24. The conditional access module 360 may use a cryptographic hash to authorize the use and display of the received signals. The conditional access module 360 may receive the proper codes or signals from the head end.

Figure 3B:
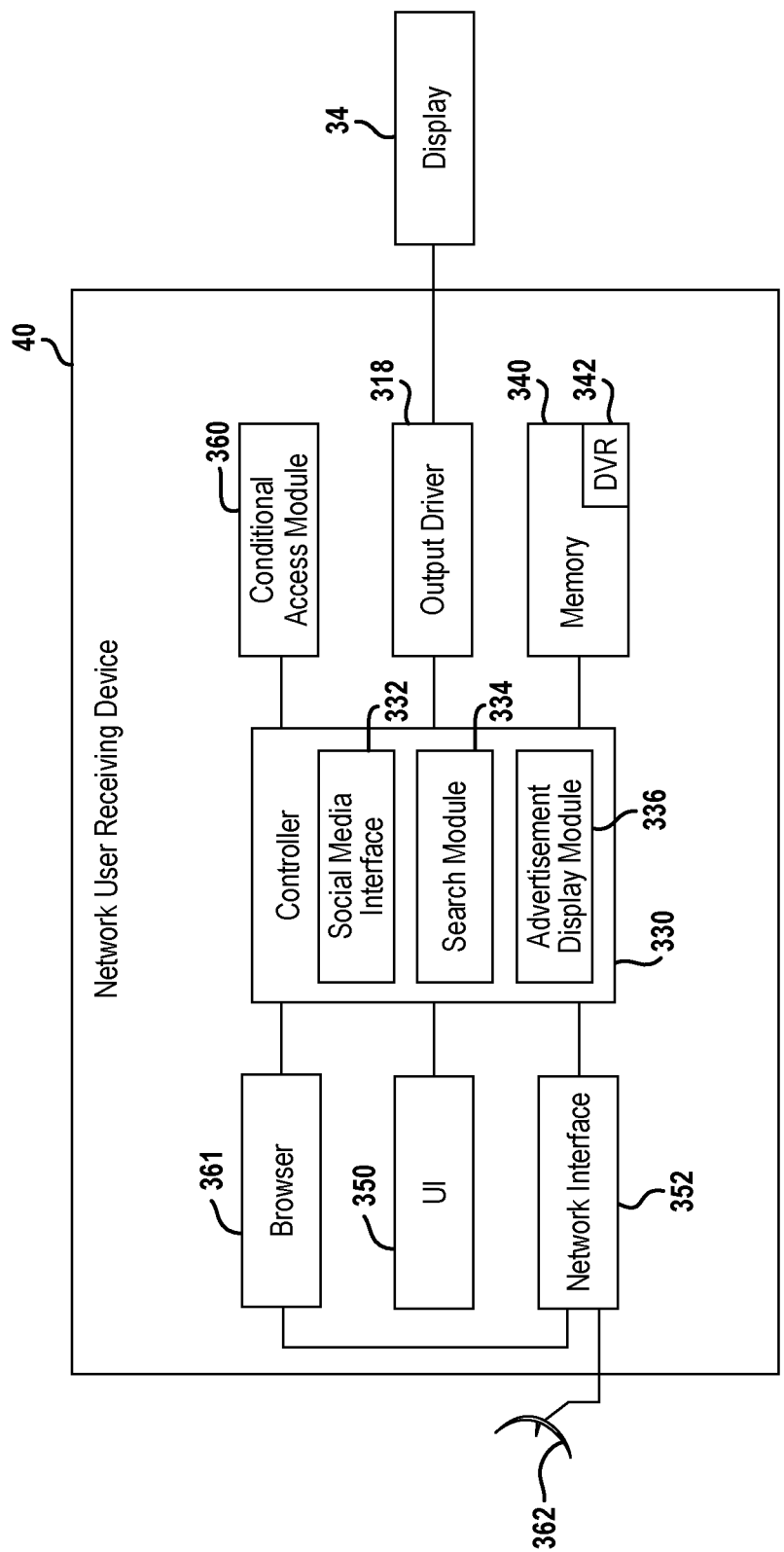
FIG. 3B is a block diagrammatic view of a network user receiving device.

Referring now to FIG. 3B, a mobile or network user device 40 is set forth. In this example, the same components from FIG. 3A are not described again. In this example, a browser 361 may be used to receive content and communicate data to the controller 330. The browser 361 may also communicate playback status signals to the head end through the network. The browser 361 may be in communication with the network interface module 352. The network interface module may communicate wireless signals through the antenna 362.

Figure 4:
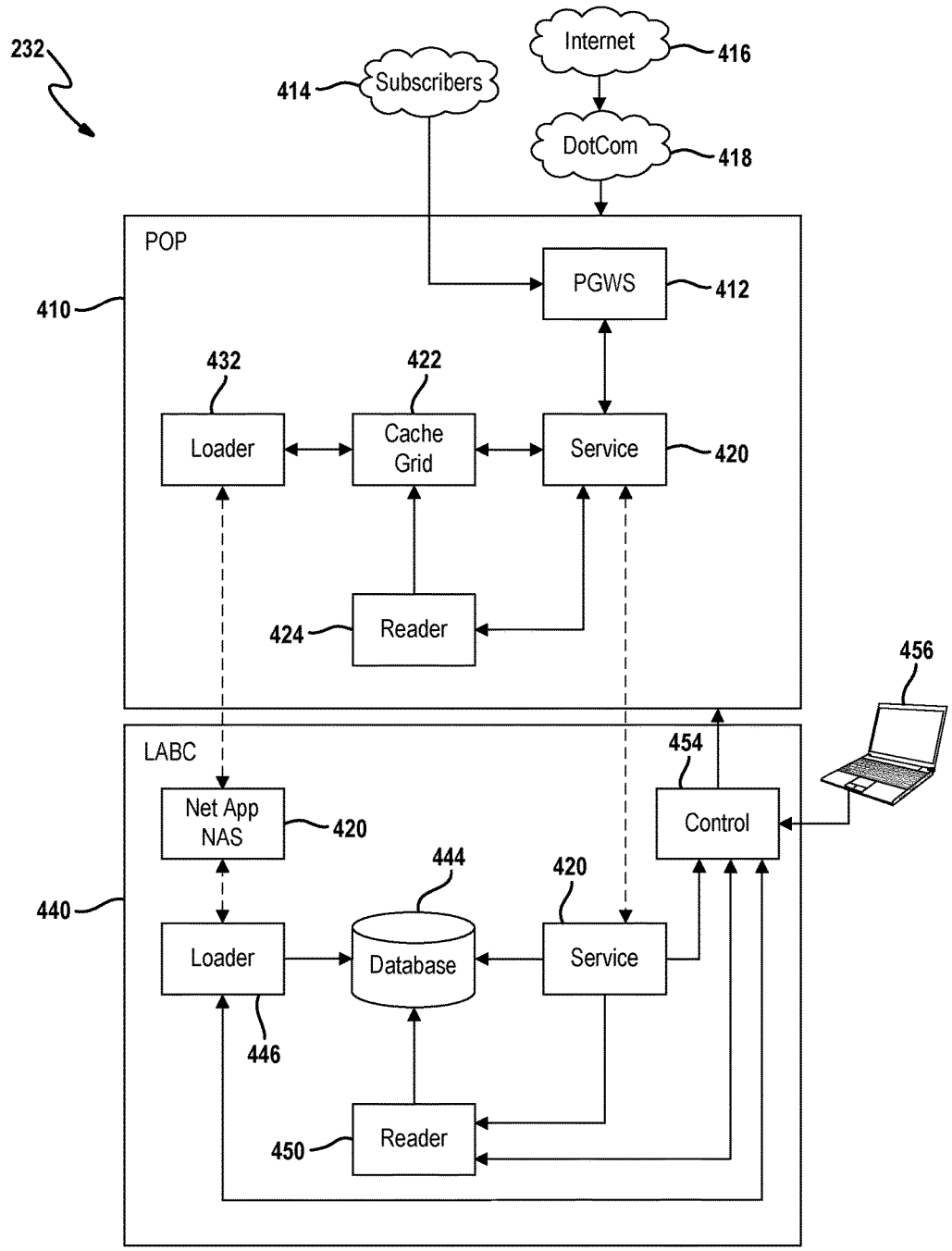
FIG. 4 is a system view of a program guide repository service.

Referring now to FIG. 4, a system level view of the program guide repository module 232 is illustrated in further detail. In this example a post office protocol (POP) location or locations 410 may be provided. It should be noted that if multiple POP locations 410 are used, they may be distributed across a geographical region such as across the United States. The POP locations may include a program guide web service (PGWS) 412. The program guide web service 412 is in communication with subscribers 414, from internet users 416 and from a website or a dot com 418. The subscribers 414 may correspond to various user devices such as user receiving devices that include set top boxes. The internet 416 may include mobile devices that interface directly with the program guide web service 412 or interface the program guide web service 412 indirectly through a service provider interface represented as the dot com 418.

The services module 420 is used to perform the services at the particular location. The service module 420 may receive requests from various clients or users for a query of the past program guide data and the current program guide data. The cache grid 422 stores a predetermined amount of program guide data such as six months' worth of data. The program guide data for the predetermined amount of time is set as the most likely data to be accessed. The cache grid 422 may thus be accessed for the most recent past data. The reader 424 interacts with the service module 420 to retrieve data from the cache grid 422.

A loader 430 is used to load historic guide data to the cache grid 422.

In a separate location 440 other components of the repository module 232 may be disposed. This system may also include a loader 442 that is used to load historic guide data to a database 444. A network application 446 is in communication with the loader 442. The network application 446 may be in communication with the loader 442 illustrated in the first location 410. A service 448 that is in communication with the service 420 illustrated at the first location 410 may be used to generate a query for content within the database 444. A reader 450 is in communication with a service 448 and the database 444. The reader 450 retrieves the data requested from the database 444.

A control module 454 may be used to control the operation of the services and monitor various functions within the locations 410 and 440. An operations interface 456 may be used to control the control module 454.

Figure 5:
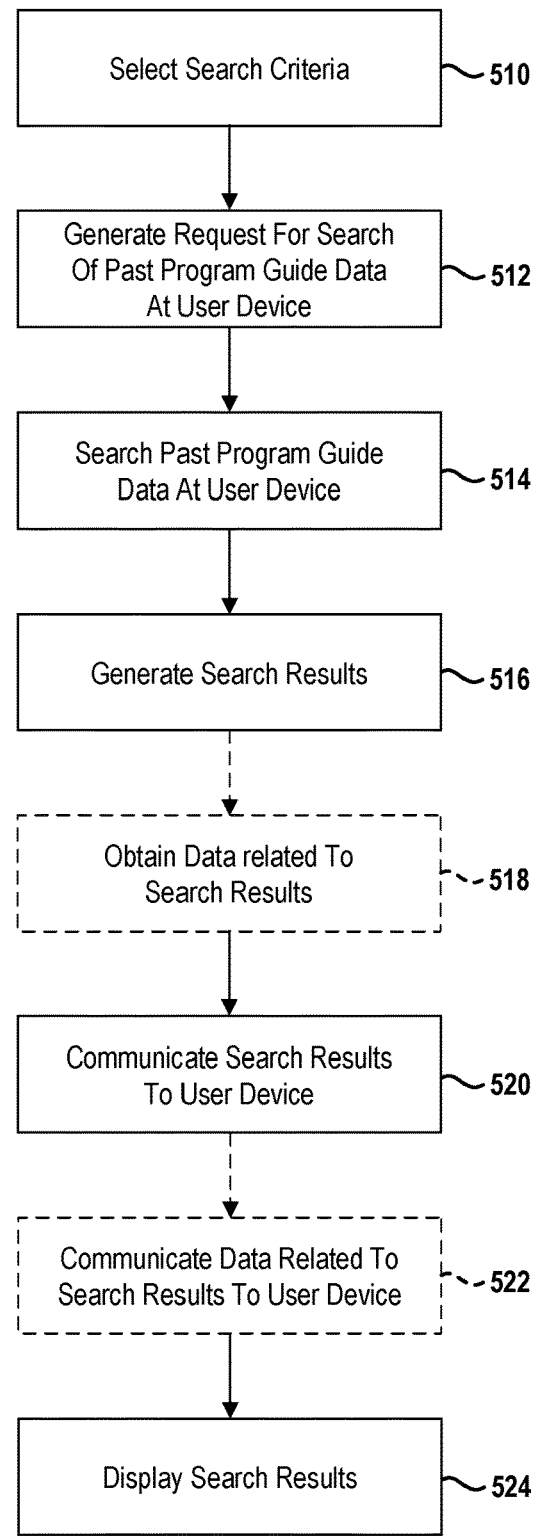
FIG. 5 is a flow chart of a method for searching past program guide data.

Referring now to FIG. 5, a method for searching and displaying past program guide data is set forth. In step 510 search criteria are selected. The searching may be performed in a traditional sense such as with key words as the search criteria. For example, program content with the same title, same actor or actresses or other types of metadata may be searched. These may be entered or selected from a user interface displayed in a screen display. A request for program guide data related to a single program or movie may also be searched.

In step 512 a request for a search of past programming guide data is requested at the user device. The request may be communicated to the head end or program guide repository through a network. The search criteria may be communicated in the request. In step 514 the past program guide data is searched. It should be noted that both past program guide and current program guide data may be included within the search. In step 516 search results are generated at the head end or program guide repository.

Optional step 518 may also be performed. In step 518 data related to the search results may be generated. The data related to the search results may be requested by the search module 234 from the related content provider 16 illustrated in FIG. 1. Of course, the related content data may also be obtained from the head end. As mentioned above, content may be related in various ways.

In step 520 the search results are communicated to the user device. The search results may be communicated through a network or the satellite. The related data may also be communicated to the user device in optional step 522. The related data may also be communicated through a network or through the satellite.

In step 524 the search results are displayed on a screen display associated with the user device. The display may generate a listing of results in a pre-formatted display. The display may also provide other features such as the ability to request that the content be stored within the user device.

Figure 6:
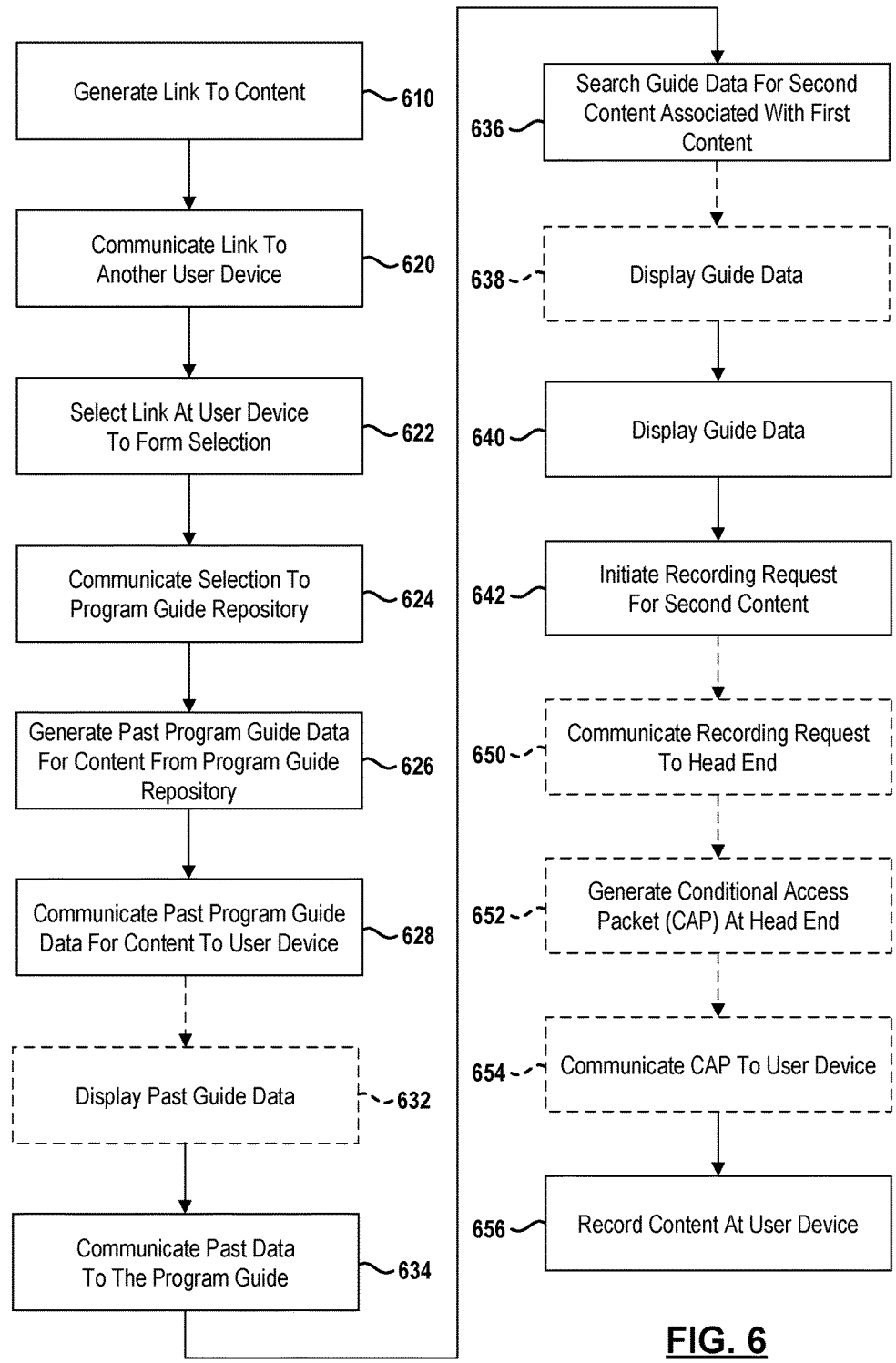
FIG. 6 is a flow chart of a method for searching past program guide data and recording future occurrences or a future occurrence of the content.

Referring now to FIG. 6, a method for recording content corresponding to a link is set forth. A link may be communicated in an email or may be posted on a social media website. A link is a reference to a particular website or data. By "clicking-on" or following the link, data may be requested or obtained.

In step 610 a link to content is generated. The link to content may be generated in various manners including watching program content on a set top box or another type of device. A screen selection may be generated from an on-screen user interface, buttons on a remote control device or buttons on the user device to form a link and post a link on a social media website or send the link to friends by way of an email or text message.

In step 620 the link is communicated to another user device. The link may be directly communicated to another user device or may be posted on a server associated with or accessible by the other user device. In this manner, a link or email may be communicated directly to a user. A link posted on a social website or another type of website is indirectly communicated.

In step 622 the user selects a link at the user device to form a selection. In step 624 the selection is communicated to the program guide repository if the link is for past content.

Current content data may be obtained directly from the program guide of the user device or program guide web service. As mentioned above this may be performed through a network such as the internet wherein the program guide repository comprises a web service. In step 626 past program guide data may be obtained for program content from the program guide repository. In step 628 the data for the content is communicated to the user device. As mentioned above the past program guide data may be communicated to the user device through a network or the satellite. In step 632 the past guide data may be displayed to the user on the user device. Step 632 is an optional step because past guide data may not be the desired result. Rather, future content corresponding to the link may be the desired result.

In step 634 first content from the past guide data may be selected for further data or information. An on-screen query may be generated to determine if further current data is sought. Because the guide data provided was past guide data similar content may be found by searching in the present or future program guide listings. In step 636 the future guide data is searched for a second content associated with or equivalent to the first content selected in step 634. That is, the same content broadcasted at a later time may be sought.

Optional step 638 may be used to obtain data related to the content selected. In step 640 the guide data for the second content related to the originally selected content may be displayed. Data related to the second content such as similar shows may also be displayed. The related data may list similar shows. In the display, the user may be presented with an option to select and record a future content.

In step 642 a recording request is initiated for the second content. Steps 650 through 654 are optional steps. Step 650 communicates a recording request to the head end. In step 652 a conditional access packet is generated at the head end for the selected future content. The conditional access packet (CAP) is communicated to the user device in step 654. It should be noted that the requesting user device may be different than the recording user device.

In step 656, the content is recorded at the user device. This may be performed by a direct request or through the optional step 650-654. Step 656 may be performed directly when the requesting device is the same as the device desired to have content recorded thereon.

Figure 7:
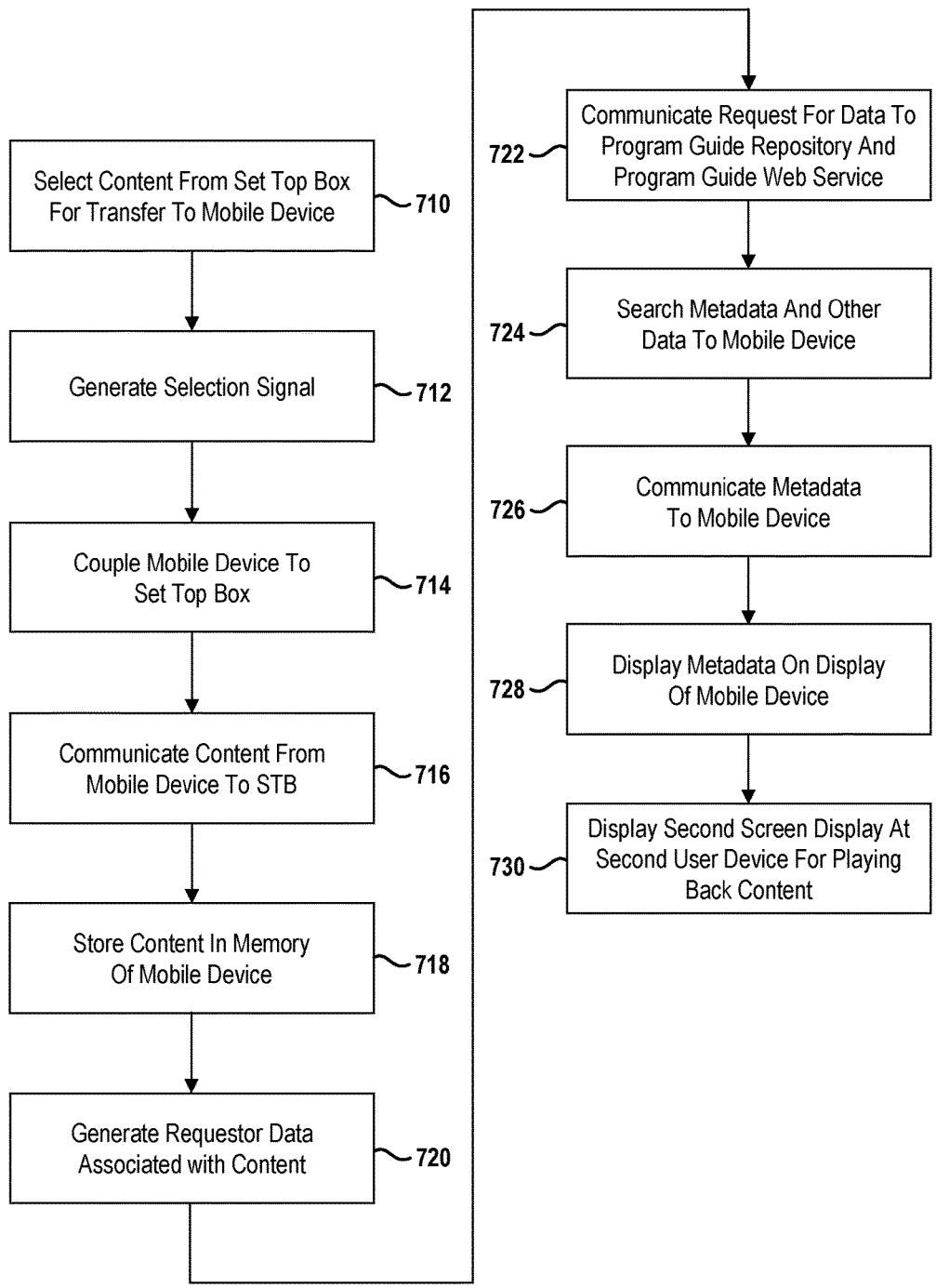
FIG. 7 is a flow chart of a method for providing past program guide data to a mobile device corresponding to content stored within the mobile device.

Referring now to FIG. 7, a method for communicating content data to a mobile device is performed. In step 710 content is selected from the set top box for transfer to a mobile device. In step 712 a selection signal is generated. In step 714 the mobile device is coupled to the set top box. In step 716 the content from the mobile device is communicated to the set top box in response to the selection signal. In step 718 the content is stored in the memory of the mobile device. The mobile device may thus playback the content at any time. However, the content may not be transferred with all of the associated metadata to save memory space within the mobile device. In step 720 the content is selected at the mobile device. Upon selection of the content, a request for data associated with the content may be generated in step 722. This will allow the mobile device to obtain the data associated with the content stored within the mobile device. This may be performed as an ad-needed process.

In step 724 the request is communicated to the program guide repository. The request may also be communicated to the program guide web service. That is, the request for data may be for data that was previously shown or broadcasted. Thus the program guide repository may be used to obtain the data.

In step 726 the metadata and other data is searched for within the program guide repository. In step 728 the metadata and other data is communicated to the mobile device. The metadata and other data may include various types of content or specifically requested content. The metadata may include posters, actor and actress's information, director information and related content. In step 730 the metadata is displayed at the mobile device.

Figure 8:
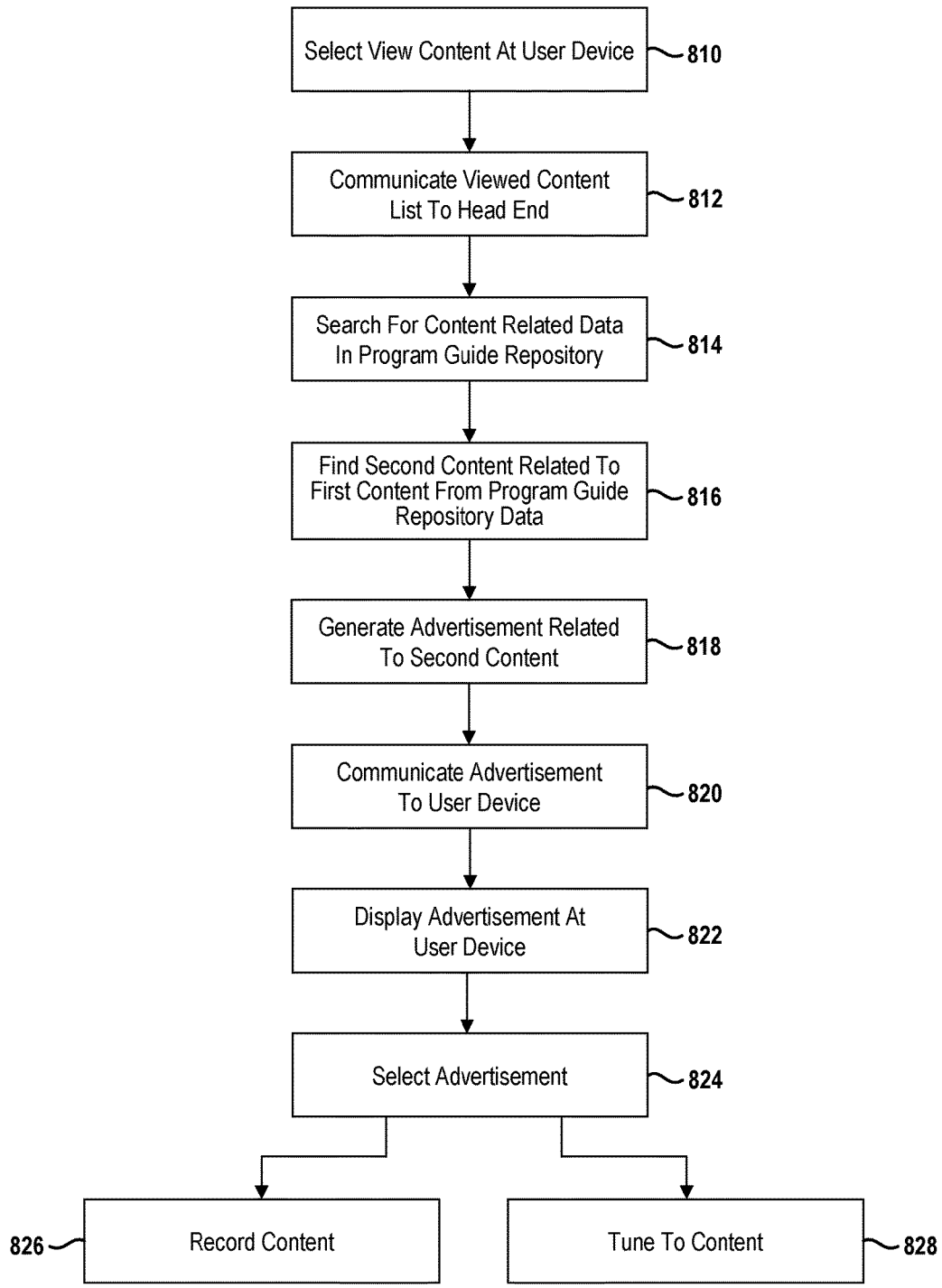
FIG. 8 is a flow chart of a method for displaying advertisement related to content previously viewed at a user device.

Referring now to FIG. 8, a method for displaying advertising is set forth. In step 810 the user of the user device views content on a display associated with a user device. In step 812 a viewed content list is communicated to the head end for the user device. In step 814 content related to the viewed content list is searched for in the program guide repository the related content data provider may also be used to obtain data. In step 816 the second content is found that is related to the first content from the program guide repository data.

In step 818 an advertisement is generated at the user device or within the head end that corresponds or is related to the second content. In step 820 the advertisement is communicated to the user device or generated at the user device using data from the advertisement generator module. In step 822 the advertisement is displayed at the user device. Thus, the advertisement is related to content previously viewed by the user at the user device. This allows the advertising to be specifically targeted to the user.

In step 824 the advertisement may be selected. Upon selection options may be presented to the user such as recording the content in step 826 or tuning to the content in step 828. Either step may initiate an action at the user device. The recording of the content may be performed within the user device on the memory or digital video recorder of the user device. Tuning to the content in step 828 may directly tune the user device to the channel associated with the content. The tuning option is presented when the content is currently being broadcasted. The recording step 828 is displayed when the advertisement provides content in the future.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   storing past program guide data for first content broadcasted in the past in a program guide repository;
   generating a link corresponding to a first content being presently viewed at a first user device using a first user interface of the first user device;
   communicating the link to a second user device using an email, a website or a text message;
   selecting the link from the second user device from a second user interface of the second user device;
   in response to selecting the link, generating, at the second user device, a request for past program guide data from the program guide repository;
   retrieving the past program guide data from the program guide repository in response to the request; and
   communicating the past program guide data to the second user device.

2. The method as recited in claim 1 wherein storing past program guide data for content broadcasted in the past in the program guide repository comprises storing past program guide data for content broadcasted in the past in the program guide repository of a head end.

3. The method as recited in claim 1 wherein receiving the request for past program guide data comprises generating a search request having search criteria for past program guide data and wherein retrieving the past program guide data comprises retrieving past program guide data corresponding to the search criteria.

4. The method as recited in claim 1 wherein receiving the request for past program guide data comprises generating the request for past program guide data from a set top box.

5. The method as recited in claim 1 wherein receiving the request for past program guide data comprises generating the request for past program guide data from a mobile device.

6. The method as recited in claim 1 wherein receiving the request for past program guide data comprises generating the request for past program guide data from a mobile device corresponding to content stored within the mobile device.

7. The method as recited in claim 6 further comprising transferring content from a set top box to the mobile device.

8. The method as recited in claim 1 wherein receiving the request for past program guide data comprises generating the request for past program guide data and related data and further comprising retrieving the related data from an external source disposed separate from the program guide repository.

9. The method as recited in claim 8 further comprising communicating related data to the second user device.

10. The method as recited in claim 1 wherein communicating the past program guide data comprises communicating past program guide data through a network.

11. The method as recited in claim 1 wherein communicating the past program guide data comprises communicating past program guide data through a satellite.

12. A system comprising:
a first user device generating a link corresponding to a first content being presently viewed in response to actions at a first user interface of the first user device;
a second user device receiving and accessing the link, and selecting the link in response to actions at a second user interface of the second user device;
a program guide repository storing past program guide data; and
a controller accessing past program guide data when the link is selected and communicating the past program guide data to the second user device located separate from the controller.

13. The system as recited in claim 12 wherein the second user device comprises a mobile user device.

14. The system as recited in claim 13 wherein the mobile user device requests past program guide data for content stored in the mobile user device.

15. The system as recited in claim 12 wherein the user device comprises a set top box.

16. The system as recited in claim 12 wherein the program guide repository is disposed in a head end.

17. The system as recited in claim 12 wherein the controller communicates related data to the user device.

18. The system as recited in claim 12 wherein the first user device communicates the link to the second user device in an email.

19. The system as recited in claim 12 wherein the first user device communicates the link to the second user device in a website.

20. The system as recited in claim 12 wherein the first user device communicates the link to the second user device in a text message.

* * * * *